Dec. 17, 1929.  G. T. COOKE  1,740,284
COTTER PIN LOCKING MEANS
Filed April 12, 1928
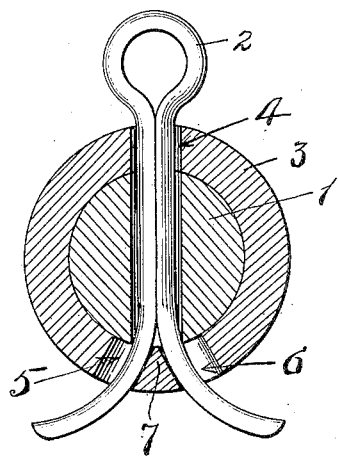
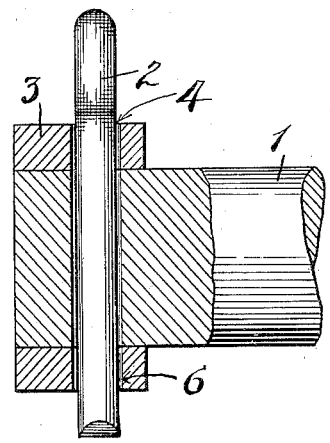
INVENTOR
George T. Cooke
BY
Mitchell Bishop
ATTORNEY Patented Dec. 17, 1929

1,740,284

UNITED STATES PATENT OFFICE

GEORGE T. COOKE, OF NORWALK, CONNECTICUT

COTTER-PIN-LOCKING MEANS

Application filed April 12, 1928. Serial No. 269,379.

This invention relates to certain new and useful improvements in cotter pin locking devices in which the ends of a cotter pin are automatically opened or spread by the mere insertion of the same into its coacting device.

The main objects of my invention include economy of production, simplicity in construction, and general adaptability.

In the drawings—

Fig. 1 is a cross sectional view of my invention as in use, the cotter pin being shown in elevation;

Fig. 2 is a longitudinal section of the parts shown in section in Fig. 1, the cotter pin being again shown in elevation.

Referring to the drawings, 1 is a pin or bolt body to which it is desired to apply a cotter pin. 2 is a sleeve mounted on the body 1. The body of the pin or bolt 1 is provided with the usual transverse cotter pin bore or passage. The sleeve 3 is provided with a cotter pin entrance passage 4 at one side and with two divergent cotter pin exit passages 5—6 at the opposite side. Between the exit passages is a wedge element 7 for spreading the ends of the cotter pin. The parts are so designed that when the sleeve 3 is properly in place, the entrance passage 4 will line up with the bore through the body 1, and the wedge will stand in line with said bore. The apex of the wedge 7 lies directly at the inner circumferential surface of the ring or sleeve 3. Thus, when a cotter pin is inserted through the entrance passage, the two ends of said cotter pin will immediately engage the apex of the wedge 7 so that the arms of the pin 2 will be compelled to straddle the wedge. As the pin 2 is forced in these ends will be automatically bent outwardly as shown in Fig. 1, whereby the cotter pin will be securely retained in place against unintentional removal or accidental escape.

The passages 4, 5 and 6 are defined by circumferentially continuous walls so that the cotter pin body and legs will be confined and prevented from transverse escape from those passages.

What I claim is:

In a cotter bolt locking device, a pin having a cotter pin passage therethrough, a sleeve adapted to be removably fitted on said bolt, said sleeve having a cotter pin entrance passage extending transversely through one side of said sleeve and having two divergent cotter pin exit passages extending transversely therethrough at the opposite side of said sleeve and a wedge between said exit passages, said wedge terminating at the inner circumferential surface of the ring, whereby the cotter pin is constrained to spread immediately upon its emergence from the bolt and is retained in its spread position.

GEORGE T. COOKE.

CERTIFICATE OF CORRECTION.

Patent No. 1,740,284.             Granted December 17, 1929, to

GEORGE T. COOKE.

It is hereby certified that error appears in the printed specification of the above numbered patent requiring correction as follows: In the claim, line 1, for the word "pin" read bolt; and that the said Letters Patent should be read with this correction therein that the same may conform to the record of the case in the Patent Office.

Signed and sealed this 9th day of December, A. D. 1930.

(Seal)

M. J. Moore,
Acting Commissioner of Patents.